Nov. 21, 1950     A. MARSH     2,531,229
GLAZING BAR
Filed Dec. 20, 1946
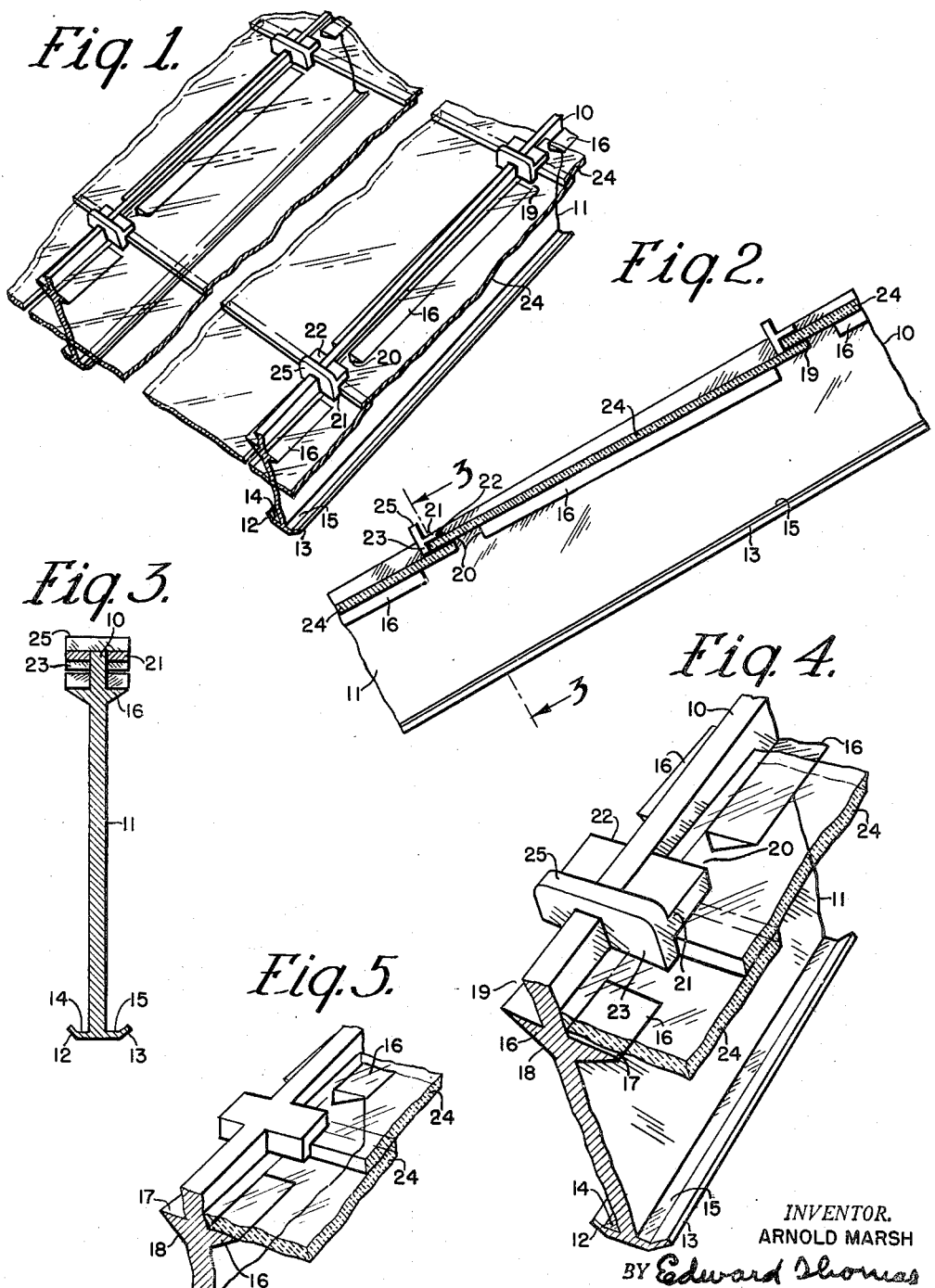
INVENTOR.
ARNOLD MARSH
BY Edward Thomas
Attorney Patented Nov. 21, 1950

2,531,229

UNITED STATES PATENT OFFICE 2,531,229

GLAZING BAR

Arnold Marsh, Woodtown Park, Rathfarnham, Eire

Application December 20, 1946, Serial No. 717,493
In England May 12, 1945

6 Claims. (Cl. 108—16)

1

This invention relates to glazing bars and is herein illustrated as embodied in a bar especially adapted to serve as a support for lights of glass in a greenhouse roof.

Greenhouse roofs have often been built with wooden glazing bars or iron glazing bars which needed to be painted every two or possibly three years, eventually rusted or rotted, and were so designed that new panes of glass had to be inserted from the outside.

Moreover, wooden bars shut out an undesirable percentage of the sunlight. The expense of erecting greenhouses has been estimated recently as $100,000 an acre, and the expense of replacing cracked and broken lights of glass is very great because of the hazards involved to workmen and the slowness of the work.

In addition, many types of glazing bars supported the glass only at widely separated points, with the result that an overlying layer of snow often broke many lights of glass by straining it at the points of support. In addition, lights of glass thus supported were easily broken by moderate sized hail stones. Moreover, drip from the bars was often annoying.

Bars have been designed for the purpose of overcoming these or other difficulties, but such bars usually were assembled from small parts which had to be accurately riveted in place and were therefore expensive, or were so irregular that they strained lights of glass to the cracking and breaking point.

According to the present invention, the foregoing and other difficulties and objections are overcome, and a metal bar is provided which may be practically non-corrodible, is light, strong, enables new lights of glass to be easily inserted from below, and the bar usually includes bottom flanges which strengthen it and serve as gutters to carry off drip.

Moreover, the bar of the present invention supports the lights of glass almost throughout their length.

In the form shown, the bar is easily rolled out of numerous alloys in two principal operations, first rolling it as a bar with straight bottom flanges and finally rolling the bottom flanges to form gutters.

If desired, the bars may include plank-supporting studs rolled in the bar to hold a plank for a workman above the glass, but that is not often needed, since new lights of glass may be inserted from below.

Other features and advantages will hereinafter appear.

2

In the accompanying drawing:

Fig. 1 is a fragmentary perspective of a roof embodying one form of the present invention.

Fig. 2 is a fragmentary sectional side view of one form of glazing bar and glass.

Fig. 3 is a sectional view on the line 3—3 of Fig. 2.

Fig. 4 is a fragmentary perspective view at an abutment.

Fig. 5 is a similar view of an alternative form of abutment and adjacent parts.

In the form shown, the bar 10 includes a vertical web 11 and horizontal bottom flanges 12 and 13 which may be each bent upwardly so as to form a pair of gutters 14 and 15 on the opposite sides of the web.

In the form shown, the web 11 carries a little below its top a side projection 16, preferably in the form of an integral longitudinal triangular lug having a flat top 17 and a side or bottom 18 which slants inward to merge with the web 11.

The projection 16 is nearly parallel with the top of the web 11, but rises about the thickness of the light of glass 24 it is to support from its beginning 19 at the upper end (of the bar) to the end 20.

In the form shown, the light of glass 24 is held against sliding down along the bar 10 because its end lies against a side lug 21 on the bar 10, having a lip 22 which overlies the end of the glass, and a vertical abutment 23 which holds the glass 24 against sliding.

The abutment 23 is usually a very small fraction of an inch shorter than the thickness of a normal light of glass, so that the lip 22 just fits over the thickest glass of the standard glass used.

The lip 22 may provide an opening for receiving the glass which tapers slightly smaller so as to tend to hold any thinner light of glass, and is preferably only about a quarter inch long, or long enough for the desired overlap, for a reason explained below.

In the form shown, the projection 16 terminates a little short of the end of the lip 22 which holds down the light of glass 24 lying on that projection 16, thus leaving a space in which the next light of glass is slidable without striking the projection.

This space enables a new light of glass to be inserted from below, if properly handled.

To insert the new light of glass from below, the new light is turned to have its long flat face stand on end facing the web 11. Then the light of glass is turned flat and its narrow end inserted beneath the light of glass resting on the projection 16 and that end pushed up and the other end lowered until said other end is passed below the lip 22.

Then the other end is resting on its own projection 16 and may be slipped or slid down under its lip 22, so that it overlies the next light of glass.

The ends of each projection 16 may be placed at any points which permit the sliding just described, and the length of the lip 22 may be of any length provided the further projection 16 is cut off at a point to permit insertion of a new light of glass from below. The longer the projection 16 the better support is had for the glass it carries.

The lip 22 may be rolled in the making of the bar 10, and it is possible to so roll it as to make a stud 25 above it, adapted to form one of a series of supports for a plank to be laid over the glass. The studs 25 may be located elsewhere, but cast less shadow at the lips 22. The gutters may be rolled as thin flat fins and be rolled or turned up in a second operation.

The bars 10 may be supported at their ends or elsewhere in any desired manner.

If made of aluminum alloy or stainless steel they may be so resistant to deterioration by weather as to be economical in the long run.

Short bars 10 may be made of plastic. Bars of plastic reinforced with fibre glass or by top and bottom longitudinal wires will have much strength, enabling them to be long. The web above the projections 16 and the projection 16 on which a light of glass lies usually make a tight roof with the glass needing no putty, and metal cuts the loss of sunlight by shadow by upwards of one-third.

For purposes of illustration, the dimensions of the accompanying drawings are much distorted, thus enabling details to be clearly shown.

In many cases, the back of the abutment 23 for one light may be almost in line with the end of the projection 16 supporting the next lower light.

Having thus described one form of the invention in some detail, what is claimed is:

1. A glazing bar adapted to hold glass in slanting position including a bar body, a ledge on the bar adapted to support a light of glass at an angle slightly inclined to the bar body, an abutment for the light on the ledge and carried by the bar and having an overhanging edge adapted to closely overlie the end of the light of glass lying on the ledge, a second ledge spaced from the first ledge inclined at substantially the same angle so as to support a second light of glass with its end surface resting upon the upper surface of the first light, a second abutment carried by the bar having an overhanging edge to hold the second light of glass and adapted to lie substantially against the upper surface of the first light, a third ledge carried by the bar inclined at substantially the same angle to hold a third light of glass under and against the first abutment and against the bottom of the first light of glass, each abutment spaced from the ledge supporting the light of glass which it holds by a distance greater than the length of its overhanging edge.

2. A glazing bar having a vertical web, a fin on the bar at an angle slightly inclined to the length of the web and adapted to support a light of glass, an abutment for the glass carried by the web and having an overlying edge terminating short of the end of the fin to allow a light of glass to be lifted vertically on edge between them, a second identical abutment for a second light of glass adapted to overlie the first light, a second fin slanting at the angle of the first fin and adapted to hold a second light of glass to lie with its face upon the first light and to end against the second abutment, and an overlying edge upon the second abutment spaced from the second fin to allow a light of glass to be lifted vertically on edge between them and adapted to lie upon the upper surface of the second light.

3. A glazing bar adapted to hold glass in slanting position including a bar body, a ledge on the bar adapted to support a light of glass at an angle slightly inclined to the bar body, an abutment for the light on the ledge and carried by the bar and having an overhanging edge adapted to closely overlie the end of the light of glass lying on the ledge, a second ledge spaced from the first ledge inclined at substantially the same angle so as to support a second light of glass with its end surface resting upon the upper surface of the first light, a second abutment carried by the bar having an overhanging edge to hold a third light of glass under and against the first abutment and against the bottom of the first light of glass, each abutment spaced from the ledge supporting the light of glass which it holds by a distance greater than the length of its overhanging edge, each inclined ledge spaced from the abutment above it to allow a light of glass to be inserted edgewise between them.

4. A glazing bar having a vertical web, a fin on the bar at an angle slightly inclined to the length of the web and adapted to support a light of glass, an abutment for the glass carried by the web and having an overlying edge terminating short of the end of the fin to allow a light of glass to be lifted vertically on edge between them, a second identical abutment for a second light of glass adapted to overlie the first light, a second fin slanting at the angle of the first fin and adapted to hold a second light of glass to lie with its face upon the first light and to end against the second abutment, and an overlying edge upon the second abutment spaced from the second fin to allow a light of glass to be lifted vertically on edge between them and adapted to lie upon the upper surface of the second light, each inclined fin spaced from the abutment to allow a light of glass to be inserted edgewise between them.

5. A glazing bar adapted to hold glass in slanting position including a bar body, a ledge on the bar adapted to support a light of glass at an angle slightly inclined to the bar body, an abutment for the light on the ledge and carried by the bar and having an overhanging edge adapted to closely overlie the end of the light of glass lying on the ledge, a second ledge spaced from the first ledge inclined at substantially the same angle so as to support a second light of glass with its end surface resting upon the upper surface of the first light, a second abutment carried by the bar having an overhanging edge to hold the second light of glass and adapted to lie substantially against the upper surface of the first light, a third ledge carried by the bar inclined at substantially the same angle to hold a third light of glass under and against the first abutment and against the bottom of the first light of glass, each abutment spaced from the ledge supporting the light of glass which it holds by a distance greater than the length of its overhanging edge and a gutter carried on the bottom of the bar body.

6. A glazing bar having a vertical web, a fin on the bar at an angle slightly inclined to the length of the web and adapted to support a light of glass, an abutment for the glass carried by the web and having an overlying edge terminating short of the end of the fin to allow a light of glass to be lifted vertically on edge between them, a second identical abutment for a second light of glass adapted to overlie the first light, a second fin slanting at the angle of the first fin and adapted to hold a second light of glass to lie with its face upon the first light and to end against the second abutment, and an overlying edge upon the second abutment spaced from the second fin to allow a light of glass to be lifted vertically on edge between them and adapted to lie upon the upper surface of the second light and a gutter carried on the bottom of the web.

ARNOLD MARSH.

REFERENCES CITED

The following references are of record in the file of this patent:

UNITED STATES PATENTS

| Number | Name | Date |
|---|---|---|
| 189,384 | Petri | Apr. 10, 1877 |
| 2,147,784 | Christal | Feb. 21, 1939 |